Jan. 24, 1950

W. F. AMON, JR., ET AL 2,495,500

LIGHT FILTER OPAQUE TO VISIBLE LIGHT AND
TRANSMITTING INFRARED RADIATION
Filed March 7, 1946

INVENTORS
William F. Amon, Jr. and
Elkan R. Blout
BY
Donald L. Brown
Attorney

Patented Jan. 24, 1950

2,495,500

UNITED STATES PATENT OFFICE 2,495,500

LIGHT FILTER OPAQUE TO VISIBLE LIGHT AND TRANSMITTING INFRARED RADIATION

William F. Amon, Jr., Boston, and Elkan R. Blout, Cambridge, Mass., assignors to Polaroid Corporation, Cambridge, Mass., a corporation of Delaware Application March 7, 1946, Serial No. 652,522

3 Claims. (Cl. 88—109)

This invention relates to apparatus designed for the selective transmission of infrared radiations at spectral regions invisible to the human eye and to selectively light-absorbing materials for use with such apparatus.

The particular object of the invention is to provide such apparatus embodying a source of heat and light radiations and having a light-filtering material which has increased absorption of visible light with increased transmission of infrared radiation, and has increased stability under adverse conditions of usage.

Another object is to provide such filtering material in the form of a coating upon a nonplanar or irregular surface.

A further object of the invention is to provide such a filtering material incorporating therein one or more direct dyes so chosen with respect to their absorption characteristics that either alone or in combination they substantially totally absorb visible light but allow high transmission of infrared radiation.

Further objects are to provide such a coating material wherein a suitable transparent lacquer is utilized and said lacquer has incorporated therein direct dyes of the type mentioned above.

The invention accordingly comprises the apparatus possessing the construction, combination of elements and arrangement of parts which are exemplified in the construction hereinafter described, and the scope of the application of which will be indicated in the claims.

Figure 1:
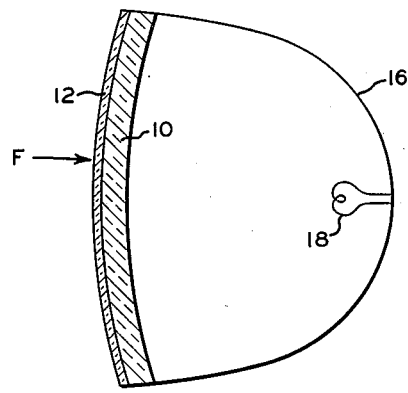
Figure 2:
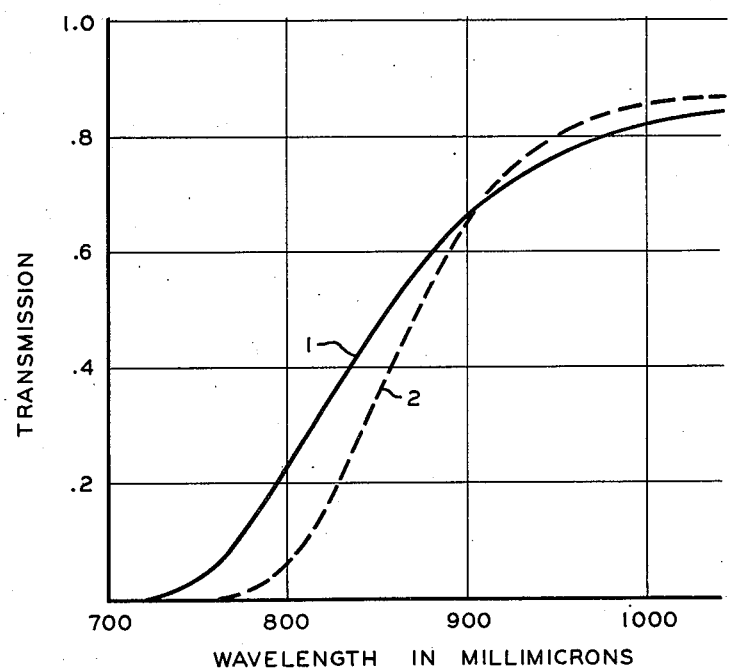

For a fuller understanding of the nature and objects of the invention, reference should be had to the following detailed description taken in connection with the accompanying drawings, wherein:

Figure 1 is a sectional view illustrating diagrammatically one embodiment of the invention; and Fig. 2 is a graph illustrating the light-transmitting properties of several embodiments of the invention.

In accordance with the present invention, it has been found possible to produce a light-filtering material having more uniform characteristics, greater stability and resistance to heat and water, more complete cutoff of the visible light, and a sharper cutoff between visible radiations and infrared radiations than previously believed possible, said filter having a nonplanar or irregular surface. In order to produce such an improved nonplanar, light-filtering material it has been found that certain lacquers having incorporated therein direct dyes give improved results.

The dye is preferably incorporated in the lacquer while the latter is carried by a suitable solvent. The lacquer is then sprayed or spread upon the surface to be coated so as to produce a uniform coating having the desired thickness and spectral characteristics.

Such a filtering material has certain advantages over the sheet materials previously utilized for filters. In the first place, the nature of the lacquer used is such as to have in itself excellent characteristics with respect to stability and resistance to heat and weathering. Such a filtering material may be applied to nonplanar surfaces such as the curved lenses on standard signalling devices. Since the filtering material itself is preferably formed with a base of a waterproof lacquer, no protective coating is required for the filtering coating. There is thus produced a cheap, easily applied coating having excellent spectral characteristics for the prevention of the transmission of any visible light while passing high percentages of infrared radiation.

Referring now to Fig. 1, element 18 represents a source of light and heat radiations such as an incandescent lamp of relatively high wattage such, for example, as a 100-watt bulb mounted in a suitable reflector housing 16 formed of an opaque material. The housing 16 has an open end thereof in which is positioned a filter F. In accordance with the invention, housing 16 and filter F are preferably so constructed and secured together as to be wholly light-tight, except for such radiation as is transmitted by filter F.

The present invention is particularly concerned with the production of devices of the type shown in Fig. 1 which can be used for secret signalling by means of the infrared radiation emitted by lamp 18, while at the same time none of the visible radiation of said lamp is permitted to escape and reveal the presence or operation of the device. This objective is complicated by the fact that the infrared radiation usually found most useful for signalling is in those regions of the spectrum closely adjacent the extreme red end of the visible spectrum. In order, therefore, to accomplish this objective, it is essential that filter F absorb as much visible light as possible, but that its degree of transmission increase very sharply in the near infrared in order to transmit as much radiation as possible in that region. A further complication is the fact that since filter F will usually be used close to the lamp 18, and since the latter will emit a relatively high degree of heat, both the filter itself and the light-absorbing substance therein must possess maximum stability to heat. It is also highly desirable that filter F possess substantial stability against conditions of moisture, since the signalling devices of the invention will usually be used out-of-doors and frequently under adverse weather conditions.

Optical filters of the conventional types heretofore in use have been found totally unsuitable for the purposes of the invention. For example, gelatin filters of the Wratten type do not possess heat stability to the degree desired in the practice of the present invention. Previously available all-glass filters do not have desired properties due to the poor absorption qualities of the inorganic coloring agents.

Referring now to the light filter F of Fig. 1, there is shown a preferred form of the present invention. In this filter F, there is provided a sheet of glass 10 having a curved surface. This curve may be due to the fact that said layer of glass constitutes a lens in an optical system including the incandescent light source, or the curve may be formed for the purpose of streamlining such as when a signalling device of the present type is used in aircraft. Due to the fact that the glass sheet 10 has a nonplanar surface, it cannot have secured thereto a sheet of a plane material without special cutting of said material or other treatment. It is proposed, therefore, to coat on the outer surface (or on the inner surface, if preferred) of glass 10 a layer 12 of the filtering material of the present invention. In its preferred form, this filtering material comprises a lacquer containing therein a direct dye, the concentration of the dye and the thickness of the lacquer coating being such as to substantially absorb all visible radiation while transmitting a high percentage of the infrared radiation. In the use of such a signalling apparatus, it has been found that the temperature in the neighborhood of the filter reaches values exceeding 100° C. With the filters of the past, such temperatures have been completely destructive of the filtering element.

The glass sheet 10 is preferably formed of a "water white" glass having a low iron content. Such a glass is particularly useful because of its high transmission in that range of the spectrum from 800 to 1000 millimicrons. A few examples of such glass are Kopp glass; Pittsburgh Plate Glass Company, Walter White plate glass #4; Libbey-Owens-Ford, Colorclear Glazing, quality X6; and J. R. Donelly Company, Water-White glass.

It has been found that the spectral efficiency of the filter is considerably affected by the use of "green" glasses, i. e., those glasses which, when examined from the edge, exhibit a green color. This green color, which is caused by an appreciable iron content in the glass, acts to absorb a considerable portion of radiation above 800 millimicrons.

The preferred lacquer-dye mixtures are formed from the following materials: Melmac 599-8, produced by American Cyanamid and Chemical Corporation, is marketed in the form of a solution containing 50% resin, 25% butanol and 25% xylene. Melmac 599-8 is an alkyd modified melamine resin. A mixture of 100 grams of Melmac 599-8 and 40 cc. methyl cellosolve containing 4.0 grams of Acid Black G (Color Index No. 247) is formed and thoroughly mixed.

For cylindrical surfaces the preferred procedure of coating the above dye-lacquer mixture involves pouring a measured quantity of the dye-lacquer mixture onto the inner surface of the cylinder and rotating the cylinder upon motor-driven rolls until dry. Infrared lamps placed over the rotating cylinder aid in speeding the drying operations.

It is also possible to coat nonplanar surfaces other than cylindrical surfaces by utilizing a suitable spray. In such spray-coating processes it was found very desirable to use an extremely fine spray in order that a uniform coating may be provided.

Another method of preparing a suitable dye-lacquer is to utilize a clear Polymerin lacquer No. 400-4, produced by Ault & Wiborg. Polymerin No. 400-4 is a urea formaldehyde resin plasticized or modified with an alkyd resin. A mixture of 100 gr. of Polymerin and 25 cc. methyl cellosolve containing 5.0 gr. of Acid Black G in solution is produced. Such a dye-lacquer mixture may be coated on nonplanar surfaces in the same manner as discussed in connection with the Melmac dye-lacquer.

In using a direct dye, it is preferred that the dye be in its purified form since impurities oftentimes interfere with the uniformity of the spectral characteristics of the resultant coating.

Fig. 2 shows the spectral characteristics of filters prepared in the above manner. Curve 1 shows the spectral characteristics of the Melmac 599-8 dye-lacquer coating, while curve 2 shows the spectral characteristics of the Polymerin 400-4 lacquer. From a study of the above curves, it is seen that the spectral characteristics of the dye-lacquer coating are excellent, having a cut-off in those ranges approaching the maximum limit of human visibility with a very sharp rise in the infrared with a high spectral transmission.

Since certain changes in the constructions set forth which embody the invention may be made without departing from its scope, it is intended that all matter contained in the above description, or shown in the accompanying drawings, shall be interpreted as illustrative and not in a limiting sense.

What is claimed is:

1. A light filter cutting off substantially all visual light but showing high transmission in the near infrared comprising a glass support of a water-white glass having a low iron content and showing high transmission for radiation in the spectral band between 800 and 1000 millimicrons and having a curved surface and a coating on said surface comprising a polymerized resin from the class consisting of the urea formaldehyde and melamine formaldehyde resins containing Acid Black G (C. I. 247) in such concentration as to block substantially all visible radiation below 700 millimicrons.

2. A light filter cutting off substantially all visual light but showing high transmission in the near infrared comprising a glass support of a water-white glass having a low iron content and showing high transmission for radiation in the spectral band between 800 and 1000 millimicrons and having a curved surface and a coating thereon comprising a polymerized urea formaldehyde resin containing Acid Black G (C. I. 247) in such concentration as to block substantially all visible radiation below 700 millimicrons.

3. A light filter cutting off substantially all visual light but showing high transmission in the near infrared comprising a glass support of a water-white glass having a low iron content and showing high transmission for radiation in the spectral band between 800 and 1000 millimicrons and having a curved surface and a coating thereon comprising a polymerized melamine formadlehyde resin containing Acid Black G (C. I. 247) in such concentration as to block substantially all visible radiation below 700 millimicrons.

WILLIAM F. AMON, JR.
ELKAN R. BLOUT.

REFERENCES CITED

The following references are of record in the file of this patent:

UNITED STATES PATENTS

| Number | Name | Date |
|---|---|---|
| 1,379,166 | Case | May 24, 1921 |
| 2,195,662 | Van Sant | Apr. 2, 1940 |
| 2,332,958 | West | Oct. 26, 1943 |
| 2,397,242 | Chubb, Jr., et al. | Mar. 26, 1946 |
| 2,400,877 | Dreyer | May 28, 1946 |
| 2,418,605 | Shepherd et al. | Apr. 8, 1947 |
| 2,444,492 | Blout et al. | July 6, 1948 |

OTHER REFERENCES

"Water White Glass," article in Scientific American, March 1941, page 143, published by Munn & Company, New York, N. Y.